Jan. 16, 1945.   R. E. MILLER   2,367,598
VARIABLE LOAD BRAKE
Filed July 30, 1942   2 Sheets-Sheet 2
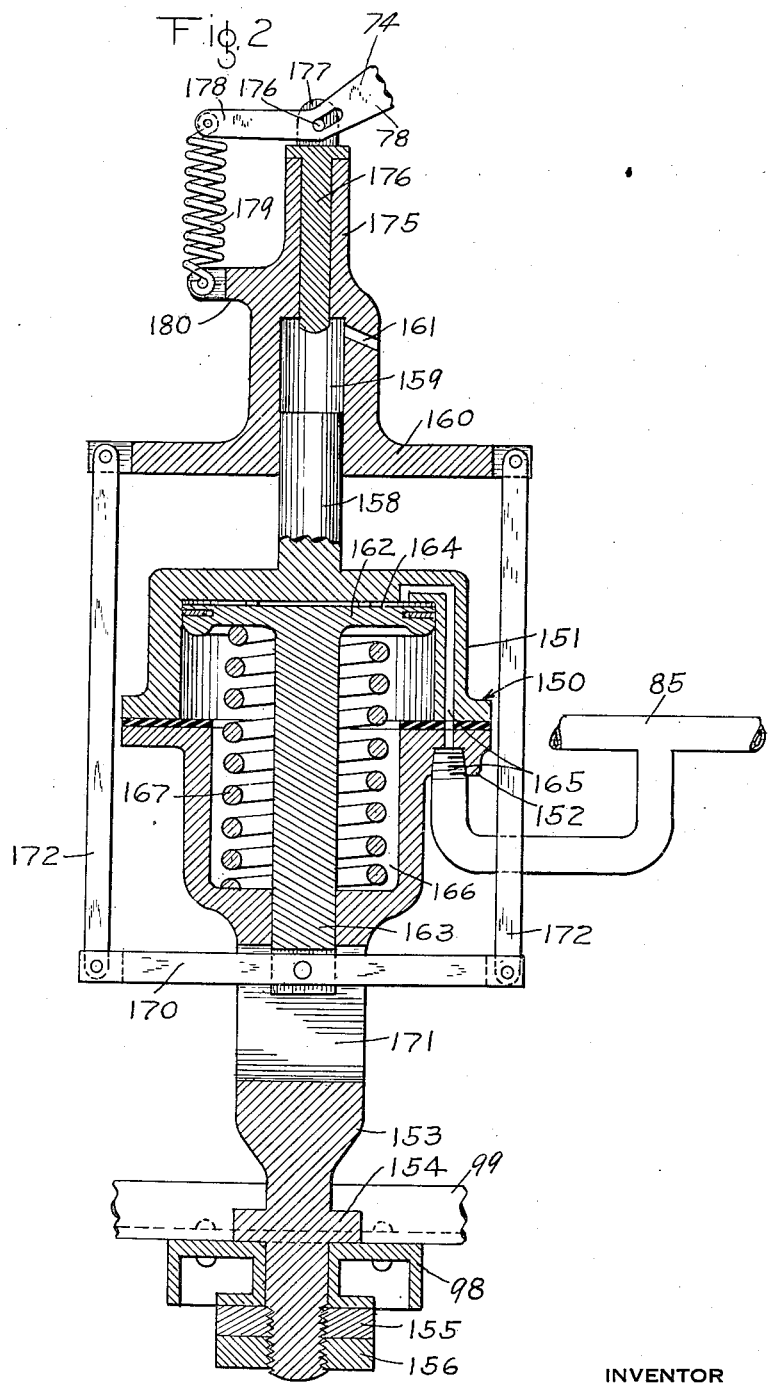
INVENTOR
RAYMOND E. MILLER
BY
A. M. Higgins
ATTORNEY Patented Jan. 16, 1945

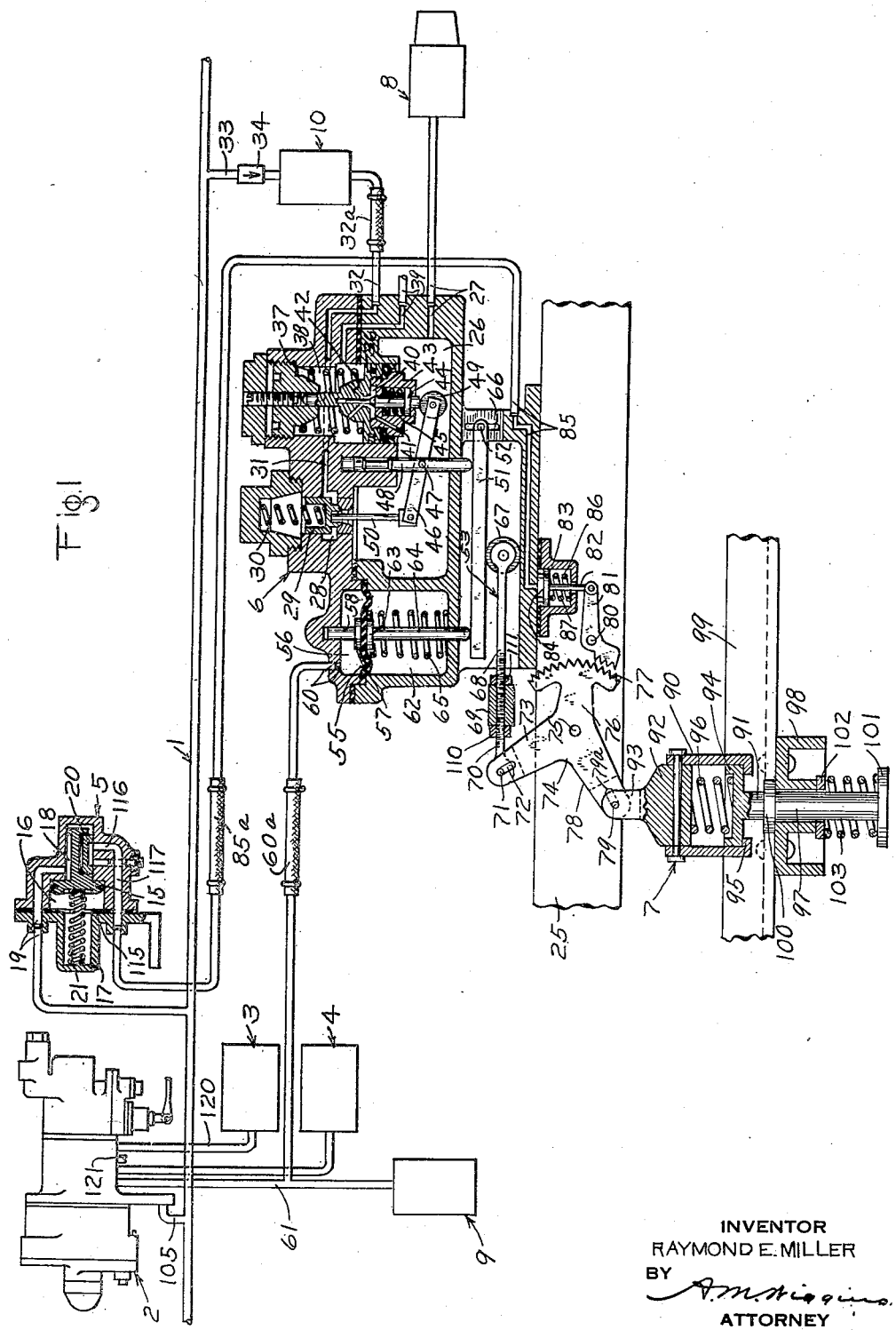

2,367,598

UNITED STATES PATENT OFFICE 2,367,598

VARIABLE LOAD BRAKE

Raymond E. Miller, Wilkinsburg, Pa., assignor to The Westinghouse Air Brake Company, Wilmerding, Pa., a corporation of Pennsylvania Application July 30, 1942, Serial No. 452,876

9 Claims. (Cl. 303—22)

This invention relates to a variable load fluid pressure brake, in which the braking power is automatically varied according to the load on the vehicle.

The principal object of the invention is to provide an improved variable load brake apparatus of the above mentioned type.

Another object of the invention is to provide a novel variable load brake apparatus which is so constructed and arranged that, when the brake pipe pressure is being increased in charging, it will be automatically conditioned or changed over from either empty or load braking, depending upon the weight carried by the body of the vehicle, and which, when the brake pipe pressure exceeds a predetermined limit, will be maintained in its conditioned state so long as the brake pipe pressure is not reduced below said predetermined limit. A further feature resides in the novel automatically operative means employed for positively locking the apparatus in any of its conditioned positions against accidental movement therefrom and for automatically unlocking the apparatus to permit its intentional operation from one of its conditioned positions to another.

Still another object of the invention is to provide a novel strut mechanism for use in conjunction with a vehicle variable load brake mechanism for determining the adjustment of the brake mechanism to provide the braking action called for by the weight carried by the vehicle.

Other objects and advantages will appear in the following detailed description of the invention.

In the accompanying drawings

Fig. 1 is a diagrammatic view, partly in section, of a variable load brake apparatus constructed in accordance with the invention.

Fig. 2 is a sectional view, on an enlarged scale, of a strut mechanism which may be substituted for the strut mechanism illustrated in Fig. 1 of the drawings.

*Description of the variable load mechanism shown in Fig. 1*

As shown in Fig. 1 of the accompanying drawings, the variable load fluid pressure brake apparatus may comprise a brake pipe 1, a brake controlling valve device 2, an auxiliary reservoir 3, an emergency reservoir 4, a changeover control valve device 5, a variable load valve device 6, a shock absorbing strut mechanism 7, a brake cylinder 8, a volume reservoir 9 and a supply reservoir 10.

The brake controlling valve device 2 shown is of the "AB" type but may be of any other desired type. This controlling valve device may be of substantially the same construction and have the same operating characteristics as the "AB" valve device fully described in the patent to Clyde C. Farmer No. 2,031,213 issued February 18, 1936, and in view of this it is deemed unnecessary to show and describe the device in detail. It will of course be understood that this mechanism operates upon a service reduction in brake pipe pressure to supply fluid under pressure from the auxiliary reservoir to the brake cylinder to effect a service application of the brakes, upon an emergency reduction in brake pipe pressure, to supply fluid under pressure from both the auxiliary and emergency reservoirs to the brake cylinder to effect an emergency application of the brakes and upon an increase in brake pipe pressure to effect a release of the brakes and the charging of the brake equipment.

The changeover control valve device 5 which may be mounted on the car body may comprise a casing in which there is mounted a piston 15. At one side of the piston there is a chamber 16 which is constantly connected through a passage 17 with the atmosphere. At the opposite side of the piston there is a valve chamber 18 which is constantly connected through a passage and pipe 19 to the brake pipe 1.

Contained in valve chamber 18 is a slide valve 20 which is adapted to be operated by a piston stem carried by the piston. Contained in chamber 16 is a spring 21 which, at all times, acts on the piston and tends to urge the piston, piston stem and slide valve toward the position in which they are shown in Fig. 1 of the drawings.

The variable load valve device 6 comprises a casing structure which is rigidly secured in any suitable manner to a sprung part of the vehicle, such for instance as the truck bolster 25. As illustrated the casing structure has formed therein a pressure chamber 26 which is connected to the brake cylinder 8 by way of a passage and pipe 27. A valve chamber 28 is formed in the casing and has mounted therein a supply valve 29, which is normally urged downwardly to its seated position by the pressure of a coil spring 30, and is adapted to control communication to the pressure chamber 26 from a fluid pressure supply passage 31 formed in the casing and communicating by way of a pipe 32 and a flexible hose 32a with the supply reservoir 10, which reservoir may be carried by the body of the vehicle and connected to the brake pipe 1 by way of a pipe 33 having interposed therein a check valve device 34. The hose 32a is for the purpose of accommodating lateral relative movement between the car body and the trucks.

Mounted in a suitable bore formed in the casing and in parallel relation with the supply valve 29 is a piston 36, which is subject on one side to the pressure of fluid in the chamber 26 and on the other side to the opposing force of a coil spring 37 that is disposed in a chamber 38 which communicates by way of a passage and pipe 39 with the atmosphere. The piston 36 has formed therein a valve chamber 40 which communicates by way of a passage 41 formed in the piston with the chamber 26 and through a passage 42 with the chamber 38. Within the valve chamber there is mounted a release valve 43 controlling communication from the valve chamber to the passage 42. The release valve 43 has a plunger portion carrying a collar 44, against which a coil spring 45 is adapted to act for urging the release valve toward unseated position.

The supply valve 29 and release valve 43 are both adapted to be controlled by operation of a lever 46 which is pivotally mounted intermediate its ends on a pin 47 carried by a plunger 48 which is slidably mounted at one end in a suitable bore formed in the casing. One end of the lever 46 is provided with a roller 49 engageable with the inner end of the stem of the release valve 43, while the other end of the lever 46 is pivotally connected to a rod 50 which is operatively aligned with the supply valve 29. The opposite end of the plunger 48 extends through the lower wall of the casing to the exterior of chamber 26 and at its end engages one end of a horizontally disposed weighing beam 51.

Horizontally disposed and in parallel relation to the supply and release valves 29 and 43, respectively, in the casing of the variable load valve device is a diaphragm 55. At one side of diaphragm 55 there is a chamber 56 containing a diaphragm follower 57 having a stem 58 which is slidably mounted in a bore formed in the casing. This chamber is connected by means of a passage and pipe 60 with a pipe 61 which extends from the control valve device 2 to the volume reservoir 9 preferably mounted on the body of the car. The pipe 60 comprises two separate parts which are connected together by a flexible hose 60a which hose accommodates relative lateral movement between the car body and the trucks.

At the opposite side of the diaphragm there is a chamber 62 containing a diaphragm follower 63 having a stem 64. The stem 64 extends through the lower wall of the casing to the exterior of chamber 62 and at its end engages the opposite end of the weighing beam 51 hereinbefore mentioned. Also contained in chamber 62 and surrounding the stem 64 is a spring 65 which is interposed between and operatively engages the diaphragm follower 63 and the lower inner wall of chamber 64.

The weighing beam 51 is connected at one end to a pin 52 which is slidably mounted in a slot 66 provided in the casing. This beam is free at its opposite end and is fulcrumed on a roller 67 which is carried at one end of an adjustable link 53.

The adjustable link 53 comprises a rod 68, to one end of which the roller 67 is secured, and also comprises a rod 70 to one end of which a pin 71 is secured, which pin is adapted to work in a slot 72 provided in an arm 73 of a bell crank lever 74. The adjacent ends of the rods 68 and 70 are screwthreaded and connected together by means of a sleeve or adjusting nut 69 so as to render the distance between the roller 67 and the arm 73 of the bell crank lever 74 adjustable for a reason hereinafter described.

The bell crank lever 74 is rotatably mounted on a pin 75 carried by the truck bolster 25 and is provided with an arm 76 which, at its end, is provided with a toothed segment 77. The arm 78 of the bell crank lever 74 is operatively connected by means of a pin 79 to the shock absorbing strut mechanism 7 in a manner hereinafter described.

Fulcrumed intermediate its ends on a pin 80 mounted on the truck bolster 25 is a rockable lever 81 having at one end a pawl portion provided with locking teeth adapted to engage the locking teeth of the segment 77 provided on the bell crank arm 76. The other end of the lever 81 is connected to a stem 82 of a piston 83.

At one side of the piston 83 there is a chamber 84 which is connected by way of a passage and pipe 85 to the change-over control valve device 5, there being interposed in the pipe at any suitable location a flexible hose 85a to accommodate relative lateral movement between the truck and car body. At the opposite side of the piston there is a chamber 86 containing a spring 87 which is interposed between and operatively engages said piston and the casing.

The shock absorbing strut mechanism 7 may comprise axially aligned upper and lower portions 90 and 91, respectively. The upper portion 90 is tubular in form and has secured to its upper end a member 92 having an upwardly extending lug 93 which is operatively connected to the arm 78 of bell crank lever 74 by means of pin 79 fixed to the lug and working in a slot 79a provided in the arm.

The upper end of the lower portion 91 of the strut mechanism is provided with a spring seat 94 which is slidably mounted in the upper portion 90, there being an inwardly extending annular lug 95 provided on the upper portion with which the under side of the spring seat is adapted to engage. Interposed between and operatively engaging the spring seat and the underside of the member 92 is a shock absorbing spring 96. Extending downwardly from the spring seat and preferably formed integral therewith is a vertically disposed stem portion 97 which passes through a bracket 98 which may be attached in any suitable manner to a fixed part of the vehicle truck, such for instance as the truck spring plank 99 indicated in Fig. 1 of the drawings.

The stem portion 97, at a point located below the spring seat 94, is provided with a collar 100 adapted to engage the upper side of the bracket 98 and at its lower end is provided with a collar or flange 101. Interposed between and operatively engaging the collar or flange 101 and a spring seat 102 provided on the bracket 98 is another shock absorbing spring 103.

It will be understood by those skilled in the art that as the load carried by the truck increases, the usual truck springs (not shown) will be compressed so that the truck bolster 25 will move downwardly relative to the spring plank 99 and that this movement will always be proportional to the weight carried. As this movement occurs on trucks equipped with the present embodiment of the invention, the bell crank lever 74, if not locked, will be caused to rock in a clockwise direction about the pin 75 for the reason that the spring 96 will be sufficiently heavy to resist deflection. Rotation of the bell crank lever 74 in a clockwise direction causes the adjustable link 53 and thereby the connected roller 67 to move in a direction toward the right hand, as viewed in the drawings.

From the foregoing it will be obvious that since roller 67 serves as a fulcrum for the weighing beam 51, any variation in the position of the roller in this direction along the beam 51 will of course change the leverage of the beam and thereby the power transmitted from the plunger 64 at the left hand end of the beam to the plunger 40 at the right hand end of the beam for the purpose of increasing the braking power in accordance with the increase in the weight of the lading carried by the vehicle, as will hereinafter be more fully described.

It should here be mentioned that where each truck of a vehicle is provided with an individually truck mounted brake cylinder or cylinders and where the vehicle is often unevenly loaded, it may be desirable to equip each truck of the vehicle with a separate variable load valve device 6 so as to control the braking force on each truck in accordance with the load carried thereby. However, where care is exercized to load the vehicle evenly it will only be necessary to equip one truck with a variable load valve device 6, which valve device may be employed to control the operation of a single brake cylinder or any combination of brake cylinders on the vehicle.

*Operation of the variable load mechanism shown in Fig. 1*

Assuming the vehicle, embodying the invention to be empty and separated from a train, the brakes on the vehicle will be released and the brake pipe 1 of the vehicle will be deplete of fluid under pressure. Under these conditions the several parts of the equipment will be in the position illustrated in Fig. 1 of the drawings.

Now if the empty vehicle is placed in a train, the brake pipe 1 will of course be connected at each end of the vehicle to the corresponding brake pipe at the adjacent end of each adjacent vehicle in the train and as a result will be charged with fluid under pressure. Fluid under pressure thus supplied to the brake pipe flows through a branch pipe 105 to the several chambers of the brake controlling valve device 2 which are to be charged and to the auxiliary and emergency reservoirs 3 and 4, respectively, in the usual manner.

Fluid under pressure flows from the brake pipe 1 to slide valve chamber 18 in the changeover control valve device 5 by way of connected pipe and passage 19, the spring 21 maintaining the piston 15 and attached slide valve 20 in the position shown until, as will be presently described, a predetermined pressure has been built up in the valve chamber 18.

Fluid under pressure supplied to brake pipe 1 also flows to the supply reservoir 10 for charging it with fluid to the pressure carried in the brake pipe, the flow of fluid to the chamber being by way of pipe 33 and check valve 34, which check valve is interposed in pipe 33 to prevent back flow of fluid under pressure from said reservoir to the brake pipe. Fluid under pressure thus supplied to reservoir 10 flows by way of pipe 32, hose 32a and passage 31 to the supply chamber 28 in the variable load valve device 6.

Since the vehicle is empty the roller 67 will be positioned in its adjusted position for empty car braking.

It should here be noted that the body of the variable load valve device 6 can be permanently marked to show the correct position of the roller 67 when the vehicle is empty, thus on new vehicles the roller 67 should coincide with such a mark on the body, which can readily be accomplished by means of the adjusting link 53. After the vehicle has been in service, the supporting springs (not shown) may take some set or the truck bolster 25 or spring plank 99 may for one reason or another become distorted and for this reason the roller will no longer coincide with the described mark when the vehicle is empty. In this case lock nuts 110 and 111 on the rods 70 and 69 respectively can be backed off, that is moved away from the adjusting nut 69. The length of the link 53 can then be adjusted by rotating the nut 69 until the roller 67 is at the empty car mark. With the roller properly positioned, the lock nuts 110 and 111 are tightened against the adjusting nut 69 to prevent accidental rotation of the nut.

Now when the pressure of fluid in valve chamber 18 of the changeover control valve device 5 has been increased to around 30 pounds, the piston 15 will be caused to move in a direction toward the left hand against the opposing pressure of the spring 21. The piston as it is thus moved acts through the medium of the stem to shift the slide valve 20 in the same direction. When the piston 15 is brought to a stop by engagement with a flexible gasket 115 the slide valve 20 will be positioned so as to uncover a port 116 in the seat for the slide valve, to the valve chamber 18, which port leads to a passage 117 communicating with pipe and passage 85. With the port 116 thus uncovered, fluid under pressure flows therethrough from the slide valve chamber 18 to the piston chamber 84 in the variable load valve device 6 by way of passage 117 and pipe and passage 85. When, due to this flow, the pressure in piston chamber 84 has been increased to a degree slightly exceeding the opposing pressure of the spring 87, the piston 83 and attached stem 82 will be caused to move downwardly as viewed in Fig. 1 of the drawings. This downward movement of the piston and stem will be transmitted to lever 81 causing said lever to rock clockwise about its pivot pin 80 thereby moving the teeth on the pawl into engagement with the toothed segment 77 on the arm 76 of the bell crank lever 74. With the teeth on the pawl and the teeth on the segment interengaged, the bell crank 74 is thereby locked against rotary movement, thus the roller 67 is held in its empty vehicle position while the vehicle is in transit or until the fluid under pressure in chamber 84 is again reduced below the value to spring 87.

It should here be mentioned that when the vehicle is in transit and the roller 67 and bell crank 74 are locked in any position by interengagement of the teeth on the pawl and the teeth on the segment 77, the relative motion between the truck bolster 25 and the truck spring plank 99 will be taken up by the shock adjusting springs 36 and 103, respectively. It will also be noted that these springs act to urge the upper and lower parts of the strut into their proper position for adjustment of the roller 67 whenever the pawl is disengaged from the bell crank.

*Application of the brakes on an empty vehicle*

When it is desired to effect an application of the brakes, the brake pipe pressure is reduced in the usual manner, causing the brake controlling valve device 2 to function to supply fluid under pressure from the auxiliary reservoir 3 to the volume reservoir 9 which in the present invention serves as a dummy brake cylinder. The flow of fluid from the auxiliary reservoir to the volume reservoir 9 is by way of a pipe 120, through the brake controlling valve device 2 and pipe 61. Fluid under pressure thus supplied to pipe 61 flows by way of connected pipe and passage 60 to chamber 56 at the upper side of diaphragm 55 in the variable load valve device 6.

Fluid under pressure supplied to chamber 56 and acting on one side of diaphragm 55 causes said diaphragm to flex downwardly against the opposing pressure of the spring 65, thereby moving the diaphragm follower 63 and stem 64 downwardly. Since the end of the stem 64 engages the weighing beam 51 such downward movement of this stem will cause the beam to rock in a counter-clockwise direction on roller 67 and move the stem or plunger 48 upwardly for effecting operation of the supply and release valves 29 and 43, respectively, in the following manner.

As is apparent in the drawings, the spring 30, for urging the supply valve 29 into seating engagement with its seat, is adapted to exert a greater force than that of the spring 45, which urges the release valve 43 to its unseated position, while the spring 37, acting on piston 36, is stronger than both the springs 30 and 45 combined. With this in mind it will be apparent that, when the beam 51 is operated to force the plunger 48 upwardly, as viewed in the drawings, the release valve 43 will first be moved into seating engagement with its seat against the opposing pressure of spring 45 and then, as upward movement of the plunger continues, the lever 46 will fulcrum on roller 49 and thereby on the stem of the seated release valve causing the lever to turn in a clockwise direction about the pin 44. As the lever 46 is thus turned in a clockwise direction, the rod 50 is forced upwardly, thereby unseating the supply valve 29 against the opposing force of the spring 30, the release valve 43 being meanwhile held in its seated position against the opposing force of the spring 45.

With the release valve 43 and the supply valve 29, seated and unseated, respectively, as just described, fluid under pressure in the supply chamber 28 flows past unseated supply valve 29 to chamber 26 from whence it flows by way of passage and pipe 27 to the brake cylinder 8 to effect an application of the brakes.

After the plunger 48 has been moved to some chosen position upwardly, the pressure of fluid thus supplied to the chamber 26 and consequently to the brake cylinder 8 will act upon the piston 36 and gradually move it upwardly as the pressure increases. Due to this movement of the piston 36 the lever 46 will rock about its pivot pin 44, thereby permitting the spring 30 to seat the supply valve 29 at a pressure in the chamber 26 as determined by the tension on spring 37 and the degree of movement of the plunger 48 upwardly.

With the vehicle empty, it will be understood that the roller 67 or fulcrum for the weighing beam 51 will be so positioned as to be substantially intermediate the length of the beam, thus the supply valve 29 will remain open to admit fluid under pressure to chamber 26 and thereby to the brake cylinder 8 until the pressure of fluid obtained in the chamber is great enough to cause the piston 36 and seated release valve to move upward a sufficient distance to permit the supply valve 29 to seat and cut off the flow of fluid to the brake cylinder. With the supply of fluid to the chamber 26 thus cut off, the piston 36 comes to a stop before the release valve can be unseated. Now if it should be desired to increase the brake cylinder pressure and thereby the degree of the brake applications the brake pipe pressure will be further reduced causing the brake controlling valve device 2 to function to increase the pressure of fluid in chamber 56. Upon such an increase the diaphragm again functions to actuate the beam 51 to effect the unseating of the supply valve 29 to admit additional fluid under pressure to the brake cylinder.

*Release of the brakes with the equipment conditioned for empty car operation*

When it is desired to effect the release of the brakes, the brake pipe pressure is increased in the usual manner, causing the brake controlling valve device 2 to function to establish communication from the pipe 61 to a pipe 121 which is connected to the atmosphere. Fluid under pressure now flows from the volume reservoir 9 to the atmosphere by way of pipe 61 through the brake controlling valve device 2 and pipe 121. Fluid under pressure in the diaphragm chamber 56 of the variable load valve also flows to the atmosphere by way of passage and pipe 60 to connected pipe 61 and then through the circuit just traced.

Upon the release of fluid under pressure from diaphragm chamber 56, the spring 65 at the opposite side of the diaphragm acts to move the diaphragm 55, diaphragm follower 63 and stem 64 upwardly to the position shown and as a result the force acting through the medium of the weighing beam 51 to move the plunger 48 upwardly is relieved so that the release valve 43 is caused to move to its release position in which position it is shown in Fig. 1 of the drawings, the supply valve 29 having been previously seated.

With the supply valve seated, the supply of fluid under pressure from the supply chamber 28 to chamber 26 is maintained cut off and with the release valve 43 unseated fluid under pressure in the brake cylinder is released to the atmosphere to effect a release of the brakes. The flow of fluid from the brake cylinder to the atmosphere is by way of pipe and passage 27, chamber 26, passage 41 in piston 36, chamber 40, past unseated release valve 43, passages 42, chamber 38 and passage and pipe 39.

*Automatic changeover operation of the equipment on a partially or fully loaded vehicle*

Assuming now that the brakes on the vehicle are released and the vehicle separated from a train and that while the brake pipe is deplete of fluid under pressure, lading is placed on the body of the vehicle. Under the influence of the additional weight, the vehicle body and consequently the truck bolster 25 will move downwardly, due to the compression of the usual bolster supporting springs (not shown) by the increased load, relative to the spring plank 99 of the vehicle truck. Since, as hereinbefore mentioned, the spring 96 in the strut mechanism 7 is of sufficient strength to resist deflection when the bell crank 74 is unlocked such movement will cause the bell crank lever to rotate in a clockwise direction about its pivot pin 75, causing link 53 and attached roller 67 to move in a direction toward the right hand as viewed in Fig. 1 of the drawings. From this it will be obvious that the distance the roller 67 is moved in this direction is dependent upon the load carried by the vehicle.

Now with the roller 67 positioned in accordance with the load added to the vehicle, the brake equipment is initially conditioned for load braking. Now when the vehicle is connected in a train, the brake pipe starts to charge with fluid under pressure in the same manner as hereinbefore described in the description of charging an empty vehicle. When the brake pipe pressure is increased to the degree required to effect operation of the changeover control valve device 5, this device will also operate as before described to permit fluid under pressure to flow to the chamber 84 in the variable load valve device 6, thus causing the piston 82, operated by such fluid, to effect movement of the pawl into locking engagement with the teeth on the segment 77 of the bell crank lever 74, thereby maintaining the roller 67 locked in its adjusted position so long as brake pipe pressure does not drop below thirty pounds in just the same manner as described in connection with the operation on an empty vehicle.

When an application of the brakes is effected on a partially or fully loaded vehicle the operation of the equipment will be identical with the operation already described for an empty vehicle, except that for a given fluid pressure in chamber 56 the resultant brake cylinder pressure will be greater to an extent dependent upon the position of the roller 67.

Description of the strut cylinder mechanism shown in Fig. 2

In Fig. 2 there is shown a different form of strut cylinder mechanism which may be substituted for the strut mechanism shown in Fig. 1. One end of this strut mechanism is rigidly connected to an unsprung part of the truck, such for instance as the bracket 98 attached to the spring plank 99. As hereinafter described this mechanism will operate to provide lost motion between the strut and the bell crank 74 after the brake pipe pressure has acted to lock the bell crank in its load adjusted position, which lost motion permits vertical movement of the strut both upwardly and downwardly relative to the bell crank lever.

As shown in Fig. 2 of the drawings this strut cylinder mechanism may comprise body casing 150 having an upper portion 151 and a lower portion 152 which portions are secured together in any suitable manner. The lower portion 152 is provided with a downwardly extending stem 153 which passes through the bracket 98. This stem is rigidly secured to the bracket 98 by means of a collar 154 which engages the upper side of the bracket 98 and by means of a nut 155 which engages the opposite or underside of the bracket and has screwthreaded engagement with the stem. A lock nut 156 is provided to insure against rotation of the nut 155 relative to the stem due to vibrations, while the vehicle is in transit.

The upper portion 151 has a centrally located vertically disposed upwardly extending stem 158 which is slidably mounted in a bore 159 provided in an adjustable head member 160, which bore is connected to the atmosphere by way of a passage 161. This stem serves as a guide for the member 160 which is movable vertically relative to the stem.

Contained in the body casing 150 is a piston 162 having a stem 163. At one side of the piston 162 there is a piston chamber 164 which is connected by way of a passage and pipe 165 to the pipe 85 which extends from the changeover control valve device 5 to the variable load valve device 6 as shown in Fig. 1. At the opposite side of the piston 162 there is a chamber 166 containing a spring 167 which spring is interposed between and operatively engages the piston and the lower inner wall of the chamber 166.

The lower end of the stem 163 extends through a central opening in the lower wall of the body casing and is attached to a horizontally disposed arm 170 which passes through an opening 171 in the stem portion 153. Each end of the arm 171 is rigidly connected to the lower end of vertically disposed link member 172. These link members are rigidly connected to their upper ends to the adjustable head member 160.

The vertically movable head portion 160 is provided with an upwardly extending axially aligned tubular portion 175 in which there is slidably mounted a pin 176. This pin is provided with an upwardly extending lug 177 which is connected to the arm 78 of the bell crank lever 74.

The arm 78 of the bell crank lever 74 employed in this embodiment of the invention is provided with an extension 178 to which one end of a tension spring 179 is attached. The opposite end of this spring is attached to a projecting lug 180 provided on the adjustable head member 160.

Operation of the strut cylinder mechanism shown in Fig. 2

From the foregoing description of the apparatus illustrated in Fig. 1 it will be understood that pipe 85 is connected to the atmosphere when the brake pipe pressure is reduced to any pressure below thirty pounds, thus the connected pipe and passage 165 and consequently piston chamber 164 in the strut cylinder mechanism illustrated in Fig. 2, will also be connected to the atmosphere.

Under these conditions the spring 167 will maintain the piston 162, piston stem 163 and connected adjustable head member 160 in the position shown. Now when the load on the vehicle is increased the vehicle truck bolster indicated at 25 in the Fig. 1 will move downwardly relative to the adjustable head member 160. It should be mentioned at this time that the head of the pin 176 is in engagement with the upper end of the member 160 so that when the bell crank lever moves down with the bolster a clockwise rocking movement is imparted to the lever, the spring 167 being of sufficient strength to resist without deflection the force exerted by the lever on the member 160 during the downward movement of the bolster. As a result of this rocking movement of the bell crank lever 74 the roller 67 is positioned along the beam 51 in accordance with the load on the vehicle.

When the pressure of fluid in the brake pipe has been increased to approximately thirty pounds, the changeover control valve device will operate to supply fluid under pressure to the pipe 85 which fluid under pressure acts to lock the bell crank in the load adjusted position, all of which will be understood from the previous description of Fig. 1.

In this embodiment of the invention fluid under pressure supplied to pipe 85 also flows from pipe 85 by way of connected pipe and passage 165 to the piston chamber 164. As the pressure in piston chamber 164 increases and after the bell crank lever 74 is securely locked in its adjusted position, the piston 162 will be caused to move downwardly against the opposing pressure of the spring 167.

Movement of the piston 162 in this direction causes the piston stem 162 and attached arm 170 to move in the same direction. Since the arm 170 is connected by means of links 172 to the adjustable head member 160 this member is also caused to move downwardly in a direction away from the locked bell crank arm 78.

Upon such movement of the adjustable head member 160 the pin 176 will remain stationary by reason of its connection with said arm so that when the system is charged with fluid under pressure and the vehicle is moving over rough track the strut mechanism will be free to move vertically relative to the locked bell crank lever due to the lost motion connection between the pin 176 and the member 160. This lost motion connection prevents the force due to road shocks from being transmitted from the fixed part of the truck to the bell crank lever, thus the locking teeth of the pawl 81 and segment 77 are free from damaging forces. This permits of the use of smaller teeth and consequent finer degrees of adjustment.

When the brake pipe is again reduced to a pressure below thirty pounds, fluid under pressure in pipe 85 and consequently in piston chambers 84 and 164 will be exhausted to the atmosphere. When this occurs the spring 87 acts to move the pawl 81 to its unlocking position and the spring 167 acts through the medium of the piston 162, piston stem 163, arm 170 and links 172 to return the adjustable head 160 to the position shown. Now if the vehicle is unloaded the pivot pin 75 for the bell crank lever will move upwardly with the truck bolster relative to the strut mechanism. As this occurs the spring 179 acts to maintain the head of the pin 176 in engagement with the sleeve portion 175 of the member 160 as shown.

It will be noted that when the piston 162 is moved downwardly under the influence of fluid pressure while the bell crank lever is locked in any adjusted position, the only force which will be transmitted from the piston to the bell crank lever will be that of the spring 179 which force will be considerably less than that of the piston 162, thus the locking teeth of the pawl 81 and segment 77 are free of the full force of the piston while the vehicle is in motion. This resilient connection also permits the piston to move the member 160 to its proper position to provide the desired lost motion between the pin 176 and the member 160.

Having now described my invention, what I claim as new and desire to secure by Letters Patent, is:

1. In a variable load brake equipment for a vehicle, in combination, control valve mechanism arranged and constructed to be conditioned to operate to control the braking power on the vehicle according to the weight of the lading carried by the vehicle to provide empty vehicle braking or any one of a plurality of degrees of loaded vehicle braking, means controlled according to variations in the weight of the lading carried for conditioning said control valve mechanism to provide the selected degree of braking, a brake pipe, means for locking said control valve mechanism in its selected conditioned position when the brake pipe is charged with fluid above a chosen pressure and operative when the brake pipe pressure is reduced below such chosen pressure to unlock said mechanism.

2. In a variable load brake equipment for a vehicle, in combination, control valve mechanism arranged and constructed to be conditioned to operate to control braking power on the vehicle according to the weight of the lading carried by the vehicle to provide empty vehicle braking or any one of a plurality of degrees of loaded vehicle braking, means controlled according to variations in the weight in the lading carried for conditioning said control valve mechanism to provide the selected degrees of braking, a brake pipe normally charged with fluid under pressure, means subject to the pressure of fluid in the brake pipe for locking said mechanism in its selected conditioned position and operative upon a reduction in brake pipe pressure to substantially atmospheric pressure for unlocking such mechanism.

3. In a vehicle variable load brake equipment of the type having a brake pipe normally charged with fluid under pressure, a brake cylinder, and a brake controlling valve device responsive to a reduction in brake pipe pressure to supply fluid under pressure to effect an application of the brakes, in combination a valve device operative to supply fluid under pressure to the brake cylinder to effect an application of the brakes, a lever operative to effect the operation of said valve means, a fulcrum for said lever movable to different positions along said lever for varying the lever ratio, means responsive to the pressure of fluid supplied by said brake controlling valve device for actuating said lever, means operative in response to variations in the weight of the lading carried by the vehicle for varying the position of said fulcrum, and means subject to the pressure of fluid from the brake pipe for maintaining said fulcrum locked in its adjusted position while the brake pipe is charged with fluid under pressure above a chosen degree and operative in response to a reduction in brake pipe pressure below said chosen degree for unlocking said fulcrum.

4. In a variable load brake equipment for a vehicle, in combination, control valve mechanism arranged and constructed to be conditioned to operate to control the braking power on the vehicle according to variations in the weight of the lading carried by the vehicle, means rockably carried by the sprung part of the vehicle and connected with an unsprung part of the vehicle to operate in response to vertical movement between said sprung and unsprung parts due to variations in the weight of the lading carried for conditioning said control valve mechanism, locking means for locking the rockable means in its conditioned position, a brake pipe, and valve means responsive to fluid under pressure in said brake pipe when said pressure is below a chosen degree to effect operation of said locking means to unlock said rockable means and operative in response to the pressure in said brake pipe when said pressure rises above a chosen degree to effect operation of said locking means to lock said rockable means in its conditioned position.

5. A variable load brake equipment for vehicles, in combination, a brake cylinder, a self-lapping unit comprising a supply and a release valve for controlling the supply of fluid under pressure to and the release of fluid under pressure from said brake cylinder, a floating lever operative to control said self-lapping unit, means for supplying power to said lever to operate it, an adjustable fulcrum for said lever, dependent upon its position, to condition the lever differently so as to effect operation of the self-lapping unit to establish a different fluid pressure in the brake cylinder for the same power exerted by said means, means operative in response to vertical movement between a fixed and movable part of the vehicle to position said fulcrum according to the load on the vehicle, a brake pipe, and valve means subject to the pressure of fluid in said brake pipe and the opposing pressure of a spring so as to be operative when the pressure of fluid in the brake pipe is less than a chosen degree to condition the fulcrum positioning means for operation and to be operative when the pressure in said brake pipe is above said chosen degree for maintaining said fulcrum positioning means locked against operation.

6. A variable load brake equipment for vehicles, in combination, a brake cylinder, a self-lapping unit comprising a supply and a release valve for controlling the supply of fluid under pressure to and the release of fluid under pressure from said brake cylinder, a plunger for controlling the operation of said self-lapping unit, a floating lever operative to control said plunger, fluid pressure operated means for applying power to said lever, a fulcrum for said lever movable relative to both said plunger and said fluid pressure operated means to condition the lever differently so as to vary the force transmitted to the plunger for the same power supplied by the fluid pressure operated means, means operative to position said fulcrum according to the load on the vehicle, said means comprising a member pivotally mounted on a sprung portion of the vehicle and operatively connected to an unsprung portion of the vehicle and operative in response to vertical movement between said sprung and unsprung portions, a brake pipe, and valve means subject to the pressure of fluid in said brake pipe and the opposing pressure of a spring so as to be operative when the pressure of fluid in the brake pipe is less than a chosen degree to condition the fulcrum positioning means for operation and to be operative when the pressure in said brake pipe is above said chosen degree for maintaining said fulcrum positioning means locked against operation.

7. In a variable load brake equipment for vehicles, in combination, a brake pipe; valve means automatically operative to vary the degree of braking; means operative according to the weight of the lading carried by the vehicle for controlling the operation of said valve means, said means comprising a horizontally disposed floating lever, an adjustable fulcrum for said lever, and fulcrum adjusting means mounted on a sprung part of the vehicle and operatively connected to an unsprung part of the vehicle movable in response to relative movement between said sprung and said unsprung part of the vehicle for positioning said fulcrum; locking means operative upon the supply of fluid under pressure thereto from said brake pipe for locking said fulcrum in its adjusted position and operative upon the release of fluid under pressure therefrom for unlocking said fulcrum; and valve means subject to a substantially fixed pressure and the opposing pressure of fluid supplied from the brake pipe operative upon a predetermined increase in pressure of fluid in said brake pipe for supplying fluid under pressure to said locking means and operative upon a decrease in pressure of fluid in said brake pipe below said predetermined brake pipe pressure for releasing fluid under pressure from said locking means.

8. In a variable load brake equipment for a vehicle having a brake pipe normally charged with fluid under pressure, in combination, control valve mechanism arranged and constructed to be conditioned to operate to control the braking power on the vehicle according to variations in the weight of the lading carried by the vehicle, means rockably carried by the sprung part of the vehicle and connected with an unsprung part of the vehicle to operate in response to vertical movement between said sprung and unsprung parts due to variations in the weight of the lading carried for conditioning said control valve mechanism, locking means subject to the pressure of fluid from the brake pipe for locking the rockable means in its conditioned position, strut means interposed in the connection between the rockable means and said unsprung part of the vehicle, and valve means responsive to fluid under pressure in said brake pipe when said pressure is below a chosen degree to effect operation of said locking means to unlock said rockable means and operative in response to the pressure in said brake pipe when said pressure rises above said chosen degree to effect operation of said locking means to lock said rockable means in its conditioned position and to at the same time effect operation of the strut mechanism to prevent excessive shocks from being transmitted to said rockable means.

9. In a variable load brake equipment for a vehicle having a brake pipe normally charged with fluid under pressure, in combination, control valve mechanism arranged and constructed to be conditioned to operate to control the braking power on the vehicle according to variations in the weight of the lading carried by the vehicle, means rockably carried by the sprung part of the vehicle and at all times connected with an unsprung part of the vehicle and operative in response to vertical movement between said sprung and unsprung parts due to variations in the weight of the lading carried for conditioning said control valve mechanism, locking means subject to fluid under pressure from the brake pipe for locking the rockable means in its conditioned position, strut means interposed in the connection between the rockable means and said unsprung part of the vehicle for preventing excessive shocks from being transmitted to said rockable means, and fluid pressure responsive means operative upon the supply thereto of fluid under a certain degree of pressure from the brake pipe to cause said locking means to lock said rockable means in its adjusted position and at the same time to cause said strut means to prevent excessive shocks from being transmitted to such rockable means.

RAYMOND E. MILLER.